United States Patent [19]

Patel et al.

[11] Patent Number: 4,713,183

[45] Date of Patent: Dec. 15, 1987

[54] OIL BASED DRILLING FLUID REVERSION

[75] Inventors: Arvind D. Patel, Houston; Carmelita Salandanan, Sugarland, both of Tex.

[73] Assignee: Dresser Industries, Inc., Dallas, Tex.

[21] Appl. No.: 838,975

[22] Filed: Mar. 12, 1986

[51] Int. Cl.$^4$ .................................................. C09K 7/06
[52] U.S. Cl. ................................ 252/8.515; 252/8.511
[58] Field of Search .......... 252/8.5 M, 8.5 P, DIG. 7, 252/8.511, 8.515

[56] References Cited

U.S. PATENT DOCUMENTS

| | | | |
|---|---|---|---|
| 2,773,068 | 12/1956 | Mannheimer | 252/542 X |
| 2,797,196 | 6/1957 | Dunn et al. | 252/8.5 |
| 3,634,235 | 1/1972 | Wilson et al. | 252/8.5 |
| 3,728,277 | 4/1973 | Foley | 252/309 |
| 4,374,737 | 2/1983 | Larson et al. | 252/8.5 |
| 4,421,655 | 12/1983 | Cowan | 252/8.5 |
| 4,442,011 | 4/1984 | Thaler et al. | 252/8.5 |
| 4,490,536 | 12/1984 | Corti et al. | 548/112 |

Primary Examiner—Herbert B. Guynn

[57] ABSTRACT

On occasion, during drilling operations employing oil base drilling muds, conditions occur that cause the surface of the solid materials in the mud to be water wet, changing the rheology of the drilling mud such that it is unusable and has to be discarded. In accordance with this invention, a novel method is provided to reverse this condition so that the water wet surfaces of the solid particles become oil wet again, restoring the drilling mud to substantially its original condition or level or to such a condition that it can continue to be used in drilling operations. This is accomplished by adding to the drilling mud containing water wet particles at least one of a specific and critical group of imidazolines.

The imidazolines may be added to stable oil mud drilling fluids to decrease possible water wetting of the particle surfaces therein.

15 Claims, No Drawings

OIL BASED DRILLING FLUID REVERSION

BACKGROUND OF THE INVENTION

Water-in-oil emulsions (oil-mud) are often used in circulating fluids required in the rotary drilling of formations containing hydrocarbons. These circulating fluids are referred to as drilling muds. These oil-mud circulating fluids are pumped down the drill pipe and out into the wellbore through holes in the drill bit and back up the well in the annular space between the drill pipe and walls of the wellbore, carrying with it drill cuttings and the like that are then removed before recirculation. This mud performs a number of functions, including removing drill cuttings, lubricating and keeping the bit cool, providing flotation to help support the weight of the drill pipe and casing, coating the wellbore surface to prevent caving in and undesirable flow of fluids in or out of the wellbore, including drilling fluids, brine, and the like.

Obviously, the properties of and the composition of these drilling mud formulations are complex and variable, depending on the conditions involved and the results desired or required including reuse and recycling of mud formulations. One of the most important properties of these drilling muds and other drilling fluids is that they be thermally stable and do not present rheological and thixotropic problems under the conditions of drilling.

In these oil mud drilling fluids, the oil is the continuous phase and the water is present in a dispersed phase. This is necessary to maintain the required rheology of the mud for drilling and completion, including a balance between gel strength and viscosity, i.e., the balance for example between pumpability of the mud and its hole cleaning capability. In an oil mud, the surface of the solid materials in the mud are essentially oil wet. If, because of a number of possible factors, the solid particles begin to be water wet, handling and other problems begin. When the suspended particle surfaces become water wet and the water in oil emulsion is converted to an oil in water emulsion, which condition is referred to as "flipped", the properties of the mud are extensively affected to a degree that the mud is no longer useful. At this point, these expensive mud formulations normally have to be discarded. Usually, an oil mud in a flipped state is too thick and viscous to handle with the normal well equipment.

The undesired conversion from water in oil to oil in water emulsions includes conversion of the solid particles from an oil wet to water wet stage. This conversion or flipping can be caused by a number of factors and conditions. One source of excess water contributing to this undesirable state may come from accidental addition of water to the mud during makeup or during recycling, and cognate water introduced into the mud from formations during drilling operations. High temperature drilling conditions can cause the conversion of the water in oil to oil in water conditions. Drilled cuttings and other materials getting into the mud during drilling operations such as shale, water sensitive and water swellable clays, drilled cement, water wet solid materials, and the like can contribute to a change in the emulsion state of the oil mud. Inexpensive and incomplex techniques and methods for preventing, or more importantly, for reversing this change in emulsion state, to reverse the flipped mud, are among the objectives of this invention.

SUMMARY OF THE INVENTION

In oil base drilling muds, the solid materials have oil wet surfaces because of the water in oil emulsion and the resulting oil base muds have the desired rheology for drilling under a variety of conditions. On occasion, during drilling operations in the field, conditions occur that cause the surface of the solid materials in the mud to be water wet, changing the rheology of the drilling mud such that it is unusable and has to be discarded. In accordance with this invention, a novel method is provided to prevent or reverse this condition so that the water wet surfaces of the solid particles become oil wet again, restoring the drilling mud to substantially its original condition or level or to such a condition that it can continue to be used in drilling operations. This is accomplished by adding to the drilling mud containing water wet particles at least one of a specific and critical group of imidazolines having the general formula

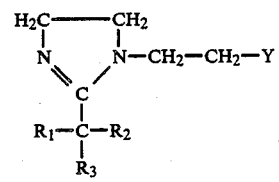

wherein Y is phosphate, hydroxyl, amine, amide or an ester, $R_1$ is hydrogen, alkyl, or carboxylic acid salt, $R_2$ is alkyl carboxylic acid salt, and $R_3$ is an alkyl radical containing 1 to 14 carbon atoms, all as hereinafter defined.

DETAILED DESCRIPTION

The imidazolines useful in the practice of the invention have the general formula

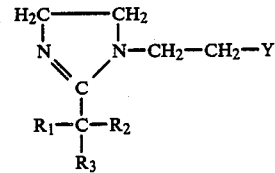

wherein (1) Y is a phosphate group having the formula

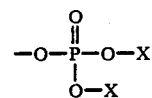

wherein X is hydrogen, $-NH_3$, or an alkaline metal cation; $-OH$; $-NH_2$, an amide of the formula

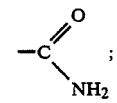

and esters of the formula

wherein R is an alkyl radical containing 1 to 12 carbon atoms; (2) $R_1$ is —H, an alkyl radical containing 1 to 4 carbon atoms, or an alkyl carboxylate radical

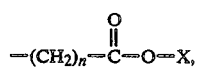

wherein n is an integer from 1 to 4, X is —H, —$NH_3$, or an alkali metal cation; (3) $R_2$ is an alkyl carboxylate radical having the formula

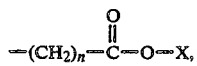

wherein n is an integer from 1 to 4, and X is —H, —$NH_3$, or an alkali metal cation; and (4) $R_3$ is an alkyl radical containing 1 to 14 carbon atoms, and may be a mixture of alkyl radicals within the range of $C_6$–$C_{14}$, i.e., obtained from coco fatty acid, for example. More preferably, Y is —OH or

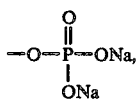

$R_1$ is H or

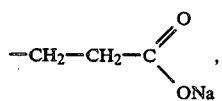

$R_2$ is

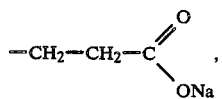

and $R_3$ is $C_6$ to $C_8$.

The preparation of imidazolines related to some of those defined herein is found in U.S. Pat. No. 4,490,536.

To be successful in the practice of this invention, it has been found that the imidazolines must have some degree of water solubility. The imidazolines that are either completely water insoluble or completely oil soluble are not effective in the practice of the invention. Water soluble imidazolines contain phosphates and/or 1 or 2 carboxylic acid groups.

It has been found that the length of the carbon chain $R_3$ is critical to the practice of the invention. When $R_3$ is an alkyl group containing 16 or more carbon atoms, the imidazoline is not effective in the practice of the invention. However, when $R_3$ alkyl groups contain less than 14, preferably an average of about $C_4$ and $C_{12}$, good results are obtained. Mixtures of alkyl groups may be used so long as the average carbon content of the alkyl groups in the molecule is about 12 or less.

Oil base drilling muds are prepared by a great variety of formulations and with a large number of ingredients, as is well known to those skilled in the art. Specific formulations depend on the state of drilling a well at any particular time, for instance, depending on the depth, the nature of the strata encountered, and the like. The process of this invention is directed to and particularly adapted to provide improved oil base drilling muds useful under conditions of high temperature and pressure, such as those encountered in deep wells, where many previously and under conditions such that water or water sensitive materials are introduced into the oil mud drilling fluids.

Oil base mud formulations including those intended for use under high temperature (up to about 500° F.) and high pressure (up to about 25,000 psi) conditions may contain a petroleum oil, a weighting agent, an emulsifier, a gelling or thixotropic agent, salts and a fluid loss control agent as the ingredients, if desired. Water is often added.

The oil (continuous phase) used in a petroleum oil, generally diesel oil or mineral seal oil, although lighter oils such as kerosene, or heavier oils such as fuel oil, white oil, crude oil, and the like may also be used. The invention is particularly useful with low viscosity, low aromatic oils, No. 2 diesel oil and mineral oils.

If water is used, the amount normally is small, and while usually is less than about 10 weight percent, amounts as high as about 60 volume percent may be present under some conditions.

Emulsifiers, both invert and wetting agents, include those normally used, including alkali and alkaline earth metal salts of fatty acids, rosin acids, tall oil acids, the synthetic emulsifiers such as alkyl aromatic sulfonates, aromatic alkyl sulfonates, long chain sulfates, oxidized tall oils, carboxylated 2-alkyl imidazolines, imidazoline salts, amido amines, alkoxy phenols, polyalkoxy alcohols, alkyl phenols, high molecular weight alcohols, and the like.

Water soluble salts often are added to the formulations normally are the brine salts such as sodium chloride, potassium chloride, sodium bromide, calcium chloride, more preferably, and the like, usually in a water solution. Formation brines and seawater may be used. These salts are added to control the osmotic pressure of the formulations as needed, according to drilling conditions.

Weighting materials, if used, include such materials as calcium carbonate, silicates, clays, and the like, but more preferably are the heavier materials such as the barites, specular hematite, iron ores, siderite, ilmenite, galena, and the like.

The oil-muds normally will be formulated to weigh from greater than about 7 (no weighting agent) to about 22 pounds per gallon of mud. Usually the range is from about 10 to 18 pounds per gallon. The water content will normally be from 0 to 60 percent by volume.

The thixotropic thickening and gelling agents normally used in many oil-mud formulations are organophilic clays. The clays used may be any of those that have substantial base-exchange capacity. A variety of such materials are known to those skilled in the art, including Wyoming bentonite, montmorillonite, hectorite, attapulgite, illite, fullers earth, beidellite, saponite, vermiculite, zeolites, and the like. Wyoming swelling bentonite and hectorite are normally utilized.

To obtain the desired organophilic clays, the swelling bentonites and hectorites are reacted with functional organic compounds, as is well known to those skilled in the art. The amount of organic compound used will be dependent on the reactivity of the clays used, but usually is from about 50 to 300 milliequivalents of an organic ammonium salt, for example, per 100 grams of clay. The reactions are normally conducted in water and the treated clay is separated and dried. Normally used are onium compounds, such as organic ammonium salts such as quaternary ammonium salts having the structural formula

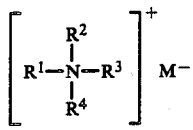

wherein $R^1$ are alkyl groups containing 1 to 20 carbon atoms, $R^2$ are alkyl groups containing 1 to 20 carbon atoms; $R^3$ are alkyl groups containing 1 to 20 carbon atoms; $R^4$ are alkyl groups containing 1 to 20 carbon atoms; and at least one of $R^1$, $R^2$, $R^3$ or $R^4$ contains at least 12 carbon atoms, and M is Cl, Br, I, OH or $SO_4$. Typical reactants include those containing quaternary ammonium cations selected from the group consisting of trimethyl octadecyl ammonium, dimethyl dihydrogenated tallow ammonium, methyl benzyl dicoco ammonium, methyl trihydrogenated tallow ammonium, methyl benzyl dihydrogenated tallow ammonium chloride, and the like. Descriptions of preparation of typical organophilic clays can be found in U.S. Pat. Nos. 2,966,506; 4,105,578; 4,382,868; and 4,425,244.

The organophilic clay content of the oil-mud formulation will usually vary inversely as the density of the oil-mud. The organoclay content may range from about 25 to 30 pounds per barrel (ppb) in low densities, to almost 0 in high densities. Normally an amount from about 2 to about 15 pounds of clay per barrel of mud will be used. The degree of suspension or hole cleaning required or requested will have an impact on the clay concentration as is well known to those skilled in the art.

Useful fluid loss control agents, if used, include for example lignite and its derivatives, humic acid, quebracho and derivatives thereof, asphalts, oxidized pitch, polymeric or natural rubber, latex materials, and the like.

In a preferred practice of the invention, the defined imidazolines are added to a flipped mud, i.e., an oil base mud wherein the particles have changed from an oil wet condition to a water wet condition. The imidazoline is usually dissolved in water, preferably in a minimum amount of water. The imidazolines may be added as such and thoroughly mixed in the oil mud. The amounts used will be such that the particles are converted from the water wet to oil wet stage. This effective amount is readily determined by a simple test on a portion of the mud, as is shown in the Examples, and is normally in an amount from about 0.1 to about 5 pounds per barrel of mud. While it may be more expensive, the imidazolines may be added to a stable oil mud drilling fluid as a precaution to prevent water wetting of particles of the mud if conditions occur such as might cause water wetting in the absence of the defined imidazoline. However, the greater value of the process of the invention is to convert water wet particles in an original oil base mud to an oil wet state so that a flipped mud is made usable again.

EXAMPLES 1-10

To demonstrate the practice of the invention and the advantages thereof, a standard oil mud was prepared and converted to a water wet mud state. A variety of imidazolines were then added to demonstrate the criticality and necessity for a particular class of imidazoline required to reverse the water wet mud to an oil wet mud, an invert emulsion.

A 15.0 pound per gallon (ppg) oil mud was prepared according to the following formulation:
147.5 weight parts mineral oil (Shell D-70)
2.0 weight parts an amido-amine emulsifier[1]
63.0 weight parts an aqueous 25% $CaCl_2$
10.0 weight parts organophilic clay[2]
5.0 weight parts lime
396.5 weight parts Barite
1.0 weight part oxidized tall oil emulsifier
[1] 2-alkyl imidazoline dicarboxylic acid adduct (U.S. Pat. No. 4,454,756)
[2] quaternized amine bentonite clay This mud had an electrical stability of 180 volts and was grainy and water wet.

The following indicated materials in amounts of one weight part were mixed into portions of this mud, and the emulsion stability of the samples was determined in accordance with API RP 13B, Eighth Edition, 1980, STANDARD PROCEDURE FOR TESTING DRILLING FLUIDS, Section 8. Refer to Table 1 for the data. The electrical stability is reported in volts, and the higher the value, the more stable the water in oil emulsion. A value of greater than about 225 volts is preferred. Observations of the treated muds are recorded below as to appearance and oil or water wet state are noted. A flipped mud is rough and grainy in appearance. A useful oil wet mud is smooth and shiny in appearance.

TABLE 1

| Additive | Electrical Stability Volts | Observation |
|---|---|---|
| (1) N=\/N—CH₂—CH₂—OH, C, C₁₀₋₁₈(tallow) | 180 | Grainy, water wet |
| (2) N=\/N, C, C₁₆₋₁₈(oleyl) | 180 | Grainy, water wet |

TABLE 1-continued

| Additive | Electrical Stability Volts | Observation |
|---|---|---|
| (3) 40% aqueous solution of imidazoline with N—CH$_2$—CH$_2$—O—P(=O)(ONa)(ONa) group and H—C(—CH$_2$—CH$_2$—C(=O)—ONa)(C$_{16}$ saturated) | 140 | Grainy, water wet |
| (4) 40% aqueous solution of imidazoline with N—CH$_2$—CH$_2$—O—P(=O)(ONa)(ONa) group and NaO—C(=O)—CH$_2$—CH$_2$—C(—CH$_2$—CH$_2$—C(=O)—ONa)(C$_{16}$ saturated) | 220 | Grainy, water wet |
| (5) 40% aqueous solution of imidazoline with N—CH$_2$—CH$_2$—OH group and H—C(—CH$_2$—CH$_2$—C(=O)—ONa)(C$_{16}$) | 180 | Grainy, water wet |
| (6) 40% aqueous solution of imidazoline with N—CH$_2$—CH$_2$—O—P(=O)(ONa)(ONa) group and NaO—C(=O)—CH$_2$—CH$_2$—C(—CH$_2$—CH$_2$—C(=O)—ONa)(C$_6$ to C$_{14}$ coco fatty acid) | 380 | Smooth shiny slurry, oil wet |
| (7) 40% aqueous solution of imidazoline with N—CH$_2$—CH$_2$—OH group and NaO—C(=O)—CH$_2$—CH$_2$—C(—CH$_2$—CH$_2$—C(=O)—ONa)(C$_6$ to C$_{14}$ coco fatty acid) | 480 | Smooth shiny slurry, oil wet |
| (8) 40% aqueous solution of imidazoline with N—CH$_2$—CH$_2$—O—P(=O)(ONa)(ONa) group and NaO—C(=O)—CH$_2$—CH$_2$—C(—CH$_2$—CH$_2$—C(=O)—ONa)(C$_6$) | 520 | Smooth shiny slurry, oil wet |
| (9) 40% aqueous solution of imidazoline with N—CH$_2$—CH$_2$—OH group and NaO—C(=O)—CH$_2$—CH$_2$—C(—CH$_2$—CH$_2$—C(=O)—ONa)(C$_6$) | 988 | Smooth shiny slurry, oil wet |

TABLE 1-continued

| Additive | Electrical Stability Volts | Observation |
| --- | --- | --- |
| (10) 40% aqueous solution<br><br>```
    N     N—CH2—CH2—OH
     \\  /
      C               O
      |               ||
    H—C—CH2—CH2—C—ONa
      |
      C6
``` | 998 | Smooth shiny slurry, oil wet |

The first 5 imidazolines used were completely ineffective in reversing the water wet mud back to the oil wet stage. The criticality of the defined and useful imidazolines is obvious when one compares Example (4) that was completely unsatisfactory and ineffective to Example (8) which was very effective in reversing the water wet to oil wet state, as shown by the electrical stability values and the oil wet condition of the treated mud.

EXAMPLE 11

This Example demonstrates how exposure to high temperature can convert a satisfactory oil mud into an unsatisfactory mud wherein the oil wet particles become water wet and the mud is useless, and how this useless mud can be converted to a useful state in accordance with this invention.

A test mud was prepared according to the following recipe:
142.0 weight parts low aromatic mineral oil (Conoco LVT)
9.0 weight parts quaternary ammonium bentonite clay
4.0 weight parts amido-amine emulsifier (Example 1)
2.0 weight parts oxidized crude tall oil wetting agent
26.6 weight parts 25% CaCl$_2$ solution
556.0 weight parts Barite
This mud as prepared had the following physical properties (API RP 138, Eighth Edition, 1980): Plastic Viscosity-38, Yield Point-11, 10 second gel-8, 10 minute gel-8, stability-1300 volts, and the mud was shiny, smooth and oil wet. After aging, this mud formulation for 16 hours at 400° F., the mud became unusable and too thick to pump because the formulation particles became water wet, as shown by the following data: Plastic Viscosity-86, Yield Point-48, 10 second gel-8, 10 minute gel-8, and emulsion stability-460 volts.

To this useless heat aged mud there was added one weight part of a 40 weight percent solution in water of

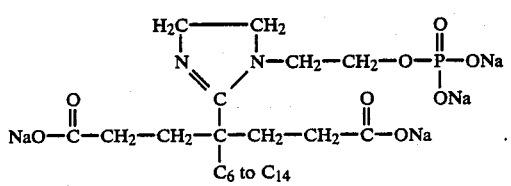

C$_6$ to C$_{14}$

On addition of the above imidazoline, the mud became shiny and smooth, having oil wet particles. The mud had the following physical properties, Plastic Viscosity-61, Yield Point-8, 10 second gel-6, 10 minute gel-8, and an emulsion stability of 880 volts.

EXAMPLE 12

This Example demonstrates that the addition of one of the defined imidazolines in accordance with this invention to a mud before exposure to destabilizing conditions, will prevent the conversion of the mud from an oil wet to a water wet condition, thus maintaining the desired rheology of the mud under conditions that would normally change the mud to a useless state so that it would have to be discarded.

To a sample of the oil mud prepared as described in Example 11, one weight part of a 40 weight percent solution in water of the imidazoline of Example 11 was added to the oil mud. This material had the following physical properties. Plastic Viscosity 43, Yield Point 11, 10-second gel 8, 10-minute gel 8, volt stability 1400, and the mud had a shiny, smooth appearance and the particles were oil wet. After aging the mud at 400° F. for 16 hours, the mud was still shiny and smooth, as well as oil wet, had a Plastic Viscosity value of 49, a Yield Point of 12, a 10-second yield point of 8 and a 10-minute gel of 10, and an emulsion stability of 1060 volts.

EXAMPLE 13

This Example demonstrates the value of the process of this invention in reversing the adverse effects of the invasion into the oil mud of water wet solids during drilling operations. A test mud was prepared according to the following formulation:
149.0 weight parts low aromatic mineral oil
4.0 weight parts oxidized tall oil wetting agent
2.0 weight parts amido-amine (Example 1)
8.5 weight parts quaternary ammonium bentonite
3.0 weight parts lime
60.6 weight parts 25% aqueous CaCl$_2$ solution
349.4 weight parts Barite
This oil base mud as mixed had the following properties: plastic viscosity-39, Yield Point-22, 10 second gel-12, 10 minute gel-28, emulsion stability-1080 volts, and was shiny, smooth and oil wet.

This satisfactory and useful oil mud was then contaminated with ¼ barrel equivalent of a 12 pound per gallon water base mud per barrel equivalent of the above oil base mud. This mixture immediately became a semi-solid, could not be pumped, and was so thick that no physical properties other than stability could be measured. This value was 140 volts, to be compared to a value of 1080 volts obtained on the original oil base mud.

This contaminated and useless mud was then mixed with one pound per barrel of a 40 weight percent solution in water of the imidazoline of Example 11. This useless mud became shiny and smooth, in an oil wet condition, and the physical properties of the treated mud were, Plastic Viscosity-70, Yield Point-25, 10 Second gel-10, 10 minute gel-31, and the emulsion stability was 770 volts, all clearly demonstrating the conversion of the contaminated mud to a useful oil mud.

When Examples 11 and 12 were repeated with the imidazolines of Examples 9 and 10, similar excellent results were obtained.

In another application of the invention, a sample of mud with undesirable properties as to water wetting of solids was treated by adding 1 weight part of the above imidazoline derivative. The resulting formulation was converted to a useful oil wet product having excellent properties, 1240 volt stability, and the product had a shiny, smooth appearance.

We claim:

1. In a petroleum oil, mud drilling fluid that has undergone conversion of at least a portion of the solid particles therein from an oil wet stage to a water wet stage, the process for substantially converting the water wet particles to an oil wet state comprising adding to the water wet drilling mud a water soluble imidazoline having the general formula $$\begin{array}{c} H_2C\text{----}CH_2 \\ | \quad\quad\quad | \\ N \quad\quad N\text{---}CH_2\text{---}CH_2\text{---}Y \\ \backslash\,/ \\ C \\ | \\ R_1\text{---}C\text{---}R_2 \\ | \\ R_3 \end{array}$$

wherein Y is (1) a phosphate group $$-O-\overset{\overset{\displaystyle O}{\|}}{\underset{\underset{\displaystyle OX}{|}}{P}}-OX$$

wherein X is —H, —$NH_3$, or an alkali metal cation, (2) —OH, (3) —$NH_2$, (4) an amide $$-C\overset{\displaystyle /\!\!/O}{\underset{\displaystyle \backslash NH_2}{}}$$

or (5) an ester $$-C\overset{\displaystyle /\!\!/O}{\underset{\displaystyle \backslash OR}{}}$$

wherein R is an alkyl radical containing 1 to 12 carbon atoms; $R_1$ is (1) —H, (2) an alkyl radical containing 1 to 6 carbon atoms, or (3)

$$-(CH_2)_n-\overset{\overset{\displaystyle O}{\|}}{C}-O-X$$

wherein n is an integer from 1 to 4 and X is —H, —$NH_3$, or an alkali metal cation; $R_2$ is an alkyl carboxylate radical of the formula $$-(CH_2)_n-\overset{\overset{\displaystyle O}{\|}}{C}-O-X$$

wherein n is an integer from 1 to 4, X is —H, —$NH_3$, or an alkali metal cation; and $R_3$ is an alkyl radical containing 1 to 14 carbon atoms.

2. The process of claim 1 wherein Y is —OH or $$-O-\overset{\overset{\displaystyle O}{\|}}{\underset{\underset{\displaystyle ONa}{|}}{P}}-ONa,$$

$R_1$ is —H or $$-CH_2CH_2-\overset{\overset{\displaystyle O}{\|}}{C}-ONa,$$

$R_2$ is $$-CH_2CH_2-\overset{\overset{\displaystyle O}{\|}}{C}-ONa,$$

and $R_3$ is $C_6$ to $C_{14}$.

3. A process of claim 2 wherein the imidazoline has the formula $$\begin{array}{c} H_2C\text{----}CH_2 \\ | \quad\quad\quad | \quad\quad\quad\quad\quad\quad\quad\quad O \\ N \quad\quad N\text{---}CH_2\text{---}CH_2\text{---}O\text{---}\overset{\|}{P}\text{---}ONa \\ \backslash\,/ \quad\quad\quad\quad\quad\quad\quad\quad\quad | \\ \overset{\displaystyle O}{\|} \quad C \quad\quad\quad\quad\quad \overset{\displaystyle O}{\|} \quad ONa \\ NaO\text{---}C\text{---}CH_2\text{---}CH_2\text{---}C\text{---}CH_2\text{---}CH_2\text{---}C\text{---}ONa \\ | \\ C_6 \text{ to } C_{14} \end{array}$$

4. A process of claim 3 wherein $R_3$ is $C_6$ to $C_8$.

5. A process of claim 4 wherein $R_3$ is $C_6$.

6. A process of claim 2 wherein the imidazoline has the formula $$\begin{array}{c} H_2C\text{----}CH_2 \\ | \quad\quad\quad | \\ N \quad\quad N\text{---}CH_2\text{---}CH_2\text{---}OH \\ \backslash\,/ \\ \overset{\displaystyle O}{\|} \quad C \quad\quad\quad\quad\quad \overset{\displaystyle O}{\|} \\ NaO\text{---}C\text{---}CH_2\text{---}CH_2\text{---}C\text{---}CH_2\text{---}CH_2\text{---}C\text{---}ONa. \\ | \\ C_6 \text{ to } C_8 \end{array}$$

7. A process of claim 6 wherein $R_3$ is $C_6$.

8. A process of claim 2 wherein the imidazoline has the formula $$\begin{array}{c} H_2C\text{----}CH_2 \\ | \quad\quad\quad | \quad\quad\quad\quad\quad\quad\quad\quad O \\ N \quad\quad N\text{---}CH_2\text{---}CH_2\text{---}O\text{---}\overset{\|}{P}\text{---}ONa. \\ \backslash\,/ \quad\quad\quad\quad\quad\quad\quad\quad\quad | \\ C \quad\quad\quad\quad\quad \overset{\displaystyle O}{\|} \quad ONa \\ H\text{---}C\text{---}CH_2\text{---}CH_2\text{---}C\text{---}ONa \\ | \\ C_6 \text{ to } C_8 \end{array}$$

9. A process of claim 8 wherein $R_3$ is $C_6$.

10. In a petroleum oil base drilling mud containing oil, wet solid particles a process for preventing the conversion of said oil wet solid particles to water wet particles comprising adding to said oil base mud a water soluble imidazoline having the general formula

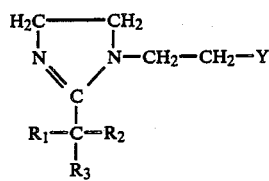

wherein Y is (I) a phosphate group

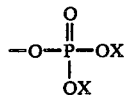

wherein X is —H, —NH$_3$, or an alkali metal cation, (2) —OH, (3) —NH$_2$, (4) an amide

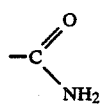

or (5) an ester

wherein R is an alkyl radical containing 1 to 12 carbon atoms; R$_1$ is (1) —H, (2) an alkyl radical containing 1 to 8 carbon atoms, or (3)

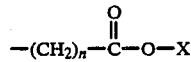

wherein n is an integer from 1 to 4 and X is —H, —NH$_3$, or an alkali metal cation; R$_2$ is an alkyl carboxylae radical of the formula

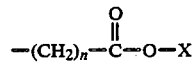

wherein n is an integer from 1 to 4, X is —H, —NH$_3$, or an alkali metal cation; and R$_3$ is an alkyl radical containing 1 to 14 carbon atoms.

11. A process of claim 10 wherein Y is —OH or

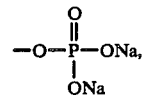

R$_1$ is —H or

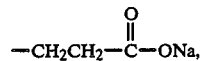

R$_2$ is

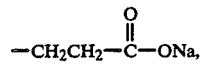

and R$_3$ is C$_6$ to C$_{14}$.

12. A process of claim 10 wherein R$_3$ is C$_6$ to C$_8$.
13. A process of claim 10 wherein R$_3$ is C$_6$.
14. A process of claim 10 wherein the imidazoline has the formula

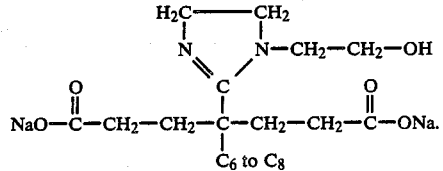

15. A process of claim 10 wherein R$_3$ is C$_6$.

* * * * *